United States Patent

Wada et al.

[15] 3,646,527

[45] Feb. 29, 1972

[54] ELECTRONIC MEMORY CIRCUIT EMPLOYING SEMICONDUCTOR MEMORY ELEMENTS AND A METHOD FOR WRITING TO THE MEMORY ELEMENT

[72] Inventors: Toshio Wada; Katsuhiro Onoda; Ryo Igarashi; Sho Nakanuma; Tohru Tsujide, all of Tokyo, Japan

[73] Assignee: Nippon Electric Company, Limited, Tokyo, Japan

[22] Filed: Mar. 31, 1970

[21] Appl. No.: 24,078

[30] Foreign Application Priority Data

Apr. 12, 1969 Japan....................................44/28422

[52] U.S. Cl. ............................340/173 R, 307/238, 307/279, 317/234 UA, 317/235 B

[51] Int. Cl. ......................................G11c 11/40, H01l 13/00

[58] Field of Search .................340/173 PP, 173 R; 307/238, 307/279; 317/234 T, 234 UA, 235 B

[56] References Cited

UNITED STATES PATENTS 3,428,875 2/1969 Snow...............................340/173 PP

*Primary Examiner*—Eugene G. Botz
*Assistant Examiner*—R. Stephen Dildine, Jr.
*Attorney*—Sandoe, Hopgood & Calimafde

[57] ABSTRACT

Data is written into a memory storage device by applying a negative voltage to the gate electrode of an MIS-type transistor, and a positive voltage to at least one of the drain and source of that transistor. The voltage difference between the gate and the source or drain exceeds a critical voltage so that electrons are injected and trapped in the gate film. Also disclosed is a memory matrix in which a plurality of MIS transistors are arranged in a matrix array and have their gate and source-drain electrodes connected to row-and-column drive lines.

6 Claims, 10 Drawing Figures

INVENTORS
TOSHIO WADA
KATSUHIRO ONODA
RYO IGARASHI
SHO NAKANUMA
TOHRU TSUJIDE by Sandoe, Hopgood & Calimafde
ATTORNEYS

INVENTORS
TOSHIO WADA
KATSUHIRO ONODA
RYO IGARASHI
SHO NAKANUMA
TOHRU TSUJIDE by
Sandoe, Hopgood & Calimafde
ATTORNEYS

*INVENTORS*
TOSHIO WADA
KATSUHIRO ONODA
RYO IGARASHI
SHO NAKANUMA
TOHRU TSUJIDE

*by* Sandoe, Hopgood & Calimafde
ATTORNEYS

ELECTRONIC MEMORY CIRCUIT EMPLOYING SEMICONDUCTOR MEMORY ELEMENTS AND A METHOD FOR WRITING TO THE MEMORY ELEMENT

DETAILED DESCRIPTION OF INVENTION

The present invention relates generally to a write-in system for a semiconductor element having a memory function, and more particularly to a memory matrix circuit using such semiconductor elements as memory bits and a nondestructive read only memory.

Magnetic, storage devices, storage devices making use of the bistable property of a flip-flop and storage devices employing an insulated gate semiconductor element (hereinafter referred to as an MIS-semiconductor element) having a metal-insulator film-semiconductor structure (hereinafter referred to as an MIS-structure) which utilize the hysteresis characteristics of the capacity-voltage characteristic curve are all used as the data or information-storing element in binary memories.

Among these storage elements, the magnetic storage device is not well suited for use as an extensive storage element requiring high-speed operation, for the reasons that high-speed readout is difficult therein, that it is difficult to couple the magnetic storage device to a following electronic circuit, and that it is very difficult to be made compact.

In order to avoid these disadvantages of the magnetic storage device, an integrated circuit is used in which a plurality of electronic circuits such as flip-flops are formed in an integrated circuit structure. In the case of a storage device for high-speed operation a bipolar type integrated circuit is most often used, while for a storage device having a large capacity, an insulated-gate-type field effect integrated circuit (hereinafter referred to as an MIS-type integrated circuit) is utilized.

In a bipolar type integrated circuit, an epitaxial layer of one conductivity-type is grown, on a substrate of an opposite conductivity type. Within this epitaxial layer are formed circuit elements such as transistors, diodes, resistors, etc., which are electrically insulated from each other by means of an isolation region of the same conductivity type as the substrate. Since this bipolar-type integrated circuit is subjected to various diffusion processes, the manufacturing process thereof is a relatively complex one and the proportion of acceptable products is reduced. In addition, this type of storage device has the disadvantages that a considerable area on the surface of the epitaxial layer is occupied by the isolation region, and that it is impossible to satisfy the requirements of more component elements per unit function. On the other hand, the MIS-type integrated circuit employing the insulated-gate-type field effect transistors (MIS-transistor) can improve the degree of integration considerably since it does not require an insulating diffusion region in contrast to the bipolar type integrated circuit, but the number of component elements per unit function cannot be decreased as it uses an electronic circuit similar to the bipolar type of integrated circuit. For instance, a flip-flop circuit used in these integrated circuits for storing one bit, is composed of six circuit elements, that is, two active elements, two load elements and two coupling elements to an external circuit. This large number of component elements serves as a bar for a semiconductor device capable of realizing an extensive integrated circuit to decrease its power dissipation to increase its functional capacity, to enhance its reliability, and to improve the yield in manufacture. In addition, another disadvantage of these integrated circuits is that upon the interruption of power supply, the stored information is entirely lost. Especially, for the purpose of decreasing the power consumption, and/or for the purpose of application to a specific storage device for high-speed readout operation which is expected for its future wide scope of utility, it is preferable that the information is retained in the storage devices upon the interruption of power supply.

As a device for decreasing the number of component elements required per unit function, a MIS-type semiconductor device is desired, which shows hysteresis characteristics in its capacity-voltage curve. With regard to the use of a MIS-type semiconductor device having this characteristic as a memory element, reference is made to the technical journal "Applied Physics Letters" Vol. 12, No. 8, pp. 260 to 263. This MIS-type semiconductor device provides a one bit/one element memory device and functions in a manner such that by applying a voltage higher than a critical value to the metallic electrode of the MIS-structure with respect to the semiconductor substrate, the density of the surface charge on the semiconductor substrate immediately beneath the insulator gate film is changed, and the surface charges are retained for a certain time duration. This retaining phenomenon of the MIS-structure is caused by the trapping of electrons injected into the silicon nitride film by means of temporary trapping centers existing in the film, and the charges may be readily lost by applying a voltage of opposite polarity to the metallic electrode or by natural discharge.

An MIS-structure in which the surface charge density of the semiconductor is changed in a more stable mode, is one which employs an insulator film containing permanent trapping centers as disclosed in copending U.S. Application Ser. No. 044. According to this newly proposed MIS-structure, there is provided a stably memorizable semiconductor element which has a large noise tolerance and which can retain the stored charge semipermanently.

Although the memory element obtained by means of an MIS-type semiconductor device which utilizes an electric charge induction effect on a semiconductor substrate caused by these trapping centers, is expected to reduce the number of the circuit elements required per unit memory function and to contribute to the enhancement of the functional capacity, a storage device has not been heretofore realized for carrying out the memory operation to a selected memory element reliably and with less effect upon the other memory elements.

An object of the present invention is to provide a novel method of writing information into a memory transistor provided with a high reliability and a high degree of integration and also having a stable memory function.

Another object of the present invention is to provide a novel high-speed memory device which is suitable for mass production, and which has a simple structure and an excellent electrical property.

Yet another object of the present invention is to provide a novel and practical semiconductor memory circuit. An additional object of this invention is to provide an integrated circuit structure suitable for the novel writing method of the present invention and having memory transistors arranged in a matrix.

According to the present invention, there is provided a method of writing data into a data storage device in which a negative voltage is applied to a gate electrode of a MIS-transistor in excess of a critical value, a positive voltage is applied to at least one of the drain-and-source electrodes, and the voltage difference between the gate and one of the drain-and-source electrodes is increased above the critical value so that the electrons are injected and trapped in the gate film. In addition, according to the present invention, there is provided a memory matrix device in which the transistors are arranged in a matrix array, the gate electrodes thereof being connected to row driving wires, and the drain and source electrodes being connected to column-driving wires and column readout wires, respectively. Second gate electrodes (substrate gate electrodes) of the respective MIS-type semiconductor elements are connected in common and maintained at a reference potential e.g., (zero potential). Due to the above-mentioned construction, the storage device according to the present invention performs a write-in operation of an information or data signal into the matrix at a desired matrix cross point, through the steps of applying a negative driving voltage to a predetermined row-driving wire, said voltage being sufficient to apply a voltage not less than a critical value to the insulator film, and applying a positive driving voltage such as an inversely biasing voltage across the drain-source junction to the columnodriving wires or column readout wires. When the voltage difference between the predetermined or addressed row and column is increased above the critical value, selective write-in operation to the predetermined cross point of memory matrix is achieved, and when the difference is lower than the critical value, the transistor located at the predetermined cross point retains its initial characteristic.

In the transistor having an inverse bias voltage applied to its drain or source electrode, a depletion layer extends into the semiconductor substrate region from one of the PN-junctions between the semiconductor substrate and the drain source regions, respectively, and by spreading this depletion layer the voltage difference between the gate electrode and the substrate surface is changed and the injection of electrons from the gate electrode into the gate insulator film can be controlled. Thus the write-in operation of an information signal into a predetermined matrix cross point element is achieved through the step of trapping electrons within the insulator gate film in the MIS-transistor located at the selected cross point, by controlling the potential on the column driving wires.

Now the present invention will be described in detail in conjunction with the accompanying drawings in connection to several preferred embodiments, in order to facilitate understanding of the objects and features of the present invention.

Figures 4, 6:
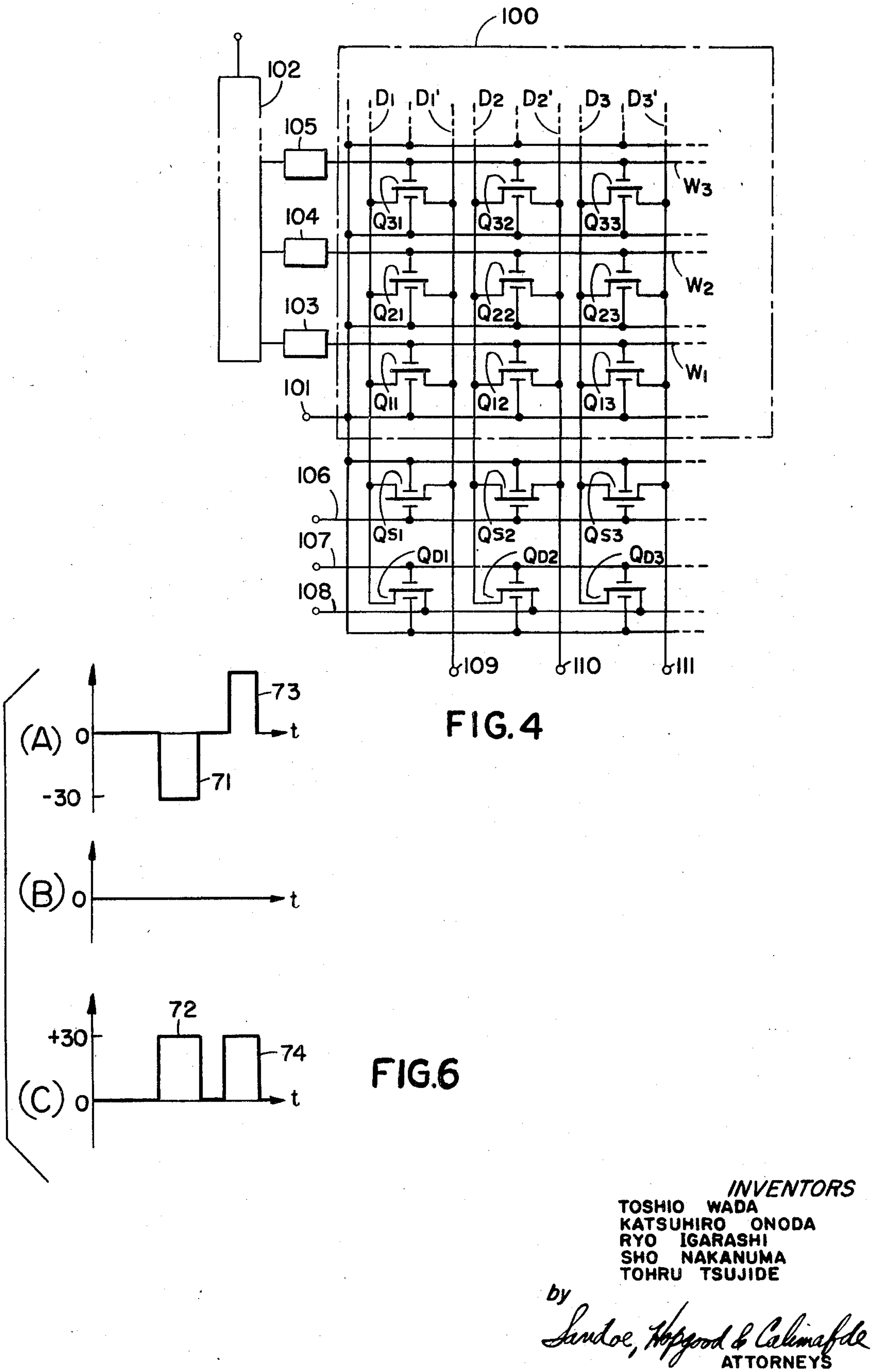
FIG. 4 is a circuit diagram applicable to a first embodiment of the present invention.

FIGS. 5(*a*) and 5(*b*) are cross-sectional views having an external circuit for explaining one embodiment of the present invention;

FIGS. 6(*a*) to 6(*c*) are voltage waveform diagrams at various portions applied to the semiconductor element during a write-in operation on the memory matrix circuit of one embodiment of the invention; and FIGS. 7(*a*) and 7(*c*) are a plan view, a cross-sectional view taken along the line *a–a'* in FIG. 7(*a*), and another cross sectional view taken along the line *b–b'* in FIG. 7(*a*), respectively, of a second embodiment of the present invention.

Figure 1:
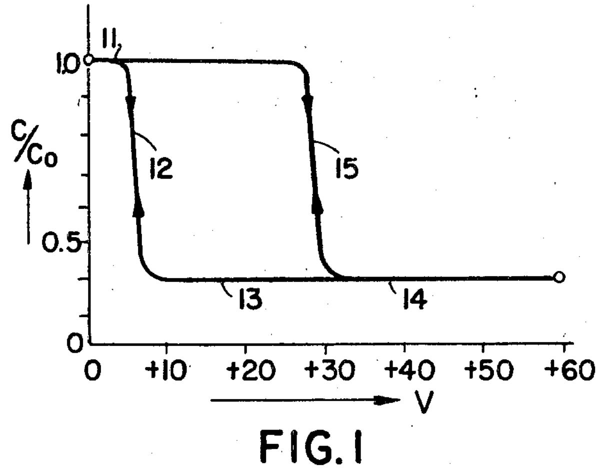
FIG. 1 is a diagram showing the capacity-applied voltage characteristic of a semiconductor element for explaining the operating principles of the semiconductor element utilized according to the present invention.

Referring now to FIG. 1, a capacity-voltage characteristic curve (C–V curve), is illustrated for an MIS-type structure which is formed by successively depositing an alumina film containing permanent trapping centers and an aluminum electrode, respectively, on a P-type silicon substrate having a specific resistance of 2Ω· cm. In this figure, the capacitance of the MIS-structure normalized by a capacitance $C_O$ due to only the insulator film, that is, $C/C_O$ is plotted along the ordinate, while the applied voltage V to the aluminum electrode with respect to the silicon substrate is plotted along the abscissa. The alumina film in one sample was grown in a gas phase by introducing a gas mixture consisting of 0.5 mol percent aluminum chloride, 1.5 mol percent carbon dioxide gas, and 98 mol percent hydrogen, onto a silicon substrate heated to about 850° C., and had a thickness of 1,800 A. In this MIS-structure, the critical value of the applied voltage to the aluminum electrode with respect to the silicon substrate that is necessitated for the permanent trapping centers in the alumina film to trap the electrons, was +40 volts or −25 volts.

The capacitance-applied voltage characteristics of the MIS-structure employing P-type silicon substrate are represented by the curve shown in FIG. 1, which is obtained by the application of a voltage lower than the critical value of +30 volts to the specimen under an accumulation state at zero bias and the application of a voltage of +60 volts which is higher than said critical value to the same specimen. The applied voltage is provided to the gate electrode with respect to the substrate. Starting from an initial state 11 and applying a voltage increasing in a positive direction, the C-V characteristic follows an initial curve 12 to arrive at a depletion state 13. After it is left at that state for a few minutes, if the applied voltage is decreased, then the characteristic again follows the curve 12 to return to the initial state 11. Accordingly, it is understood that by means of an applied voltage of about 30 volts the electrons cannot be trapped within the alumina film. However, if this specimen is left at a depletion state 14 for about 1 minute by means of an applied voltage of +60 volts, then the C-V characteristic for returning from the depletion state 14 to the initial state 11 is shifted to a curve 15 which is displaced in a positive direction to the extent of about 20 volts from the curve 12. Once transferred, the shifted C-V curve so obtained is very stable, so that by applying an appropriate gate voltage it is readily distinguished from the initial C-V curve. Furthermore, if necessary, it is easy to transfer this curve sufficiently in order to achieve a large noise tolerance.

Figure 2:
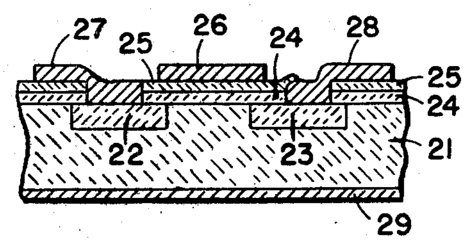
FIG. 2 is a cross-sectional view of a semiconductor element preferably used in the memory element of the present invention.

Referring to FIG. 2, a MIS-transistor making use of the characteristics as shown in FIG. 1 as its insulator gate is formed in such manner that into a silicon substrate 21 of one conductivity type a drain and a source regions 22, 23 of an opposite conductivity type are diffused in a gaseous phase. A thin silicon dioxide film 24 and an alumina film 25 are successively deposited onto the substrate surface, a metal film of gate electrode 26 lead wires 27, 28 respectively are provided on alumina film 25 making ohmic contact with the drain and source regions 22, 23, and a base gate electrode 29 is formed on the opposite surface of substrate 21 making ohmic contact with the substrate. The vapor growth of the alumina film 25 is similar to that described in the above-mentioned copending application and its thickness is 1,800 A. In addition, the silicon dioxide film 24 may be obtained by a thermal oxidization grown method or by a vapor growth method, and it has a thickness within the range of about 0 to 500 A. depending upon the requirement. The channel length and the channel width of this MIS-transistor are 7$\mu$ and 300$\mu$, respectively.

Figure 3:
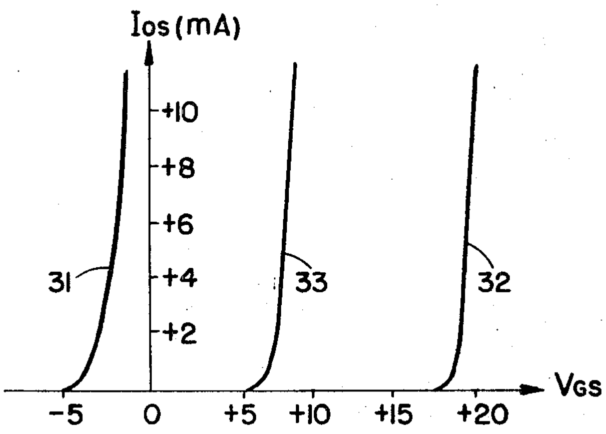
FIG. 3 is a diagram of the static characteristics of the semiconductor element shown in FIG. 2.

FIG. 3 shows the operating characteristic of an N-channel-type transistor when the MIS-type transistor is manufactured by making use of a P-type silicon substrate 21 of 2Ω·cm. in resistivity, in which drain current $I_{DS}$ is plotted along the ordinate and gate voltage $V_{GS}$ is plotted along the abscissa. The voltage between the drain and the source during the measurement was +15 volts. The static characteristic curve 31 in this figure relates to the MIS-transistor silicon dioxide shown in FIG. 2 having the silicon dioxide film 24 of 200 A. in thickness and shows an initial characteristic when a gate voltage not less than a critical value is not applied to the insulator film of alumina of the transistor. The characteristic curve 32 shows a static characteristic after the application of a voltage exceeding the critical value to the alumina gate film 25, by applying an AC-voltage having an effective value of about 50 volts between the respective gate electrodes 26, 29 of for 20 seconds to inject electrons to the trapping centers in the alumina gate film 25. This MIS-type transistor with the shifted characteristic as shown by the curve 32 operates in an enhancement mode. On the other hand, the MIS-transistor with the initial characteristic shown by the curve 31 operates in a depletion mode, so that it is suitable for a memory element utilizing its bistable characteristics as well as the conventional electronic circuit, or for a unit memory element in a memory matrix. Still further, since the written information would not be lost by the electrical operation upon readout and the initial characteristic would not be shifted in the operation range less than the critical value, it can realize a small-sized, highly reliable integrated circuit for nondestructive readout.

In addition, the characteristic of an N-channel MIS-type transistor in its initial state having no silicon dioxide film under the alumina gate film in FIG. 2, is shown by a characteristic curve 33 in the enhancement region. In the case of the MIS-transistor having such a simplified structure the characteristic for the threshold voltage of the gate would also have a high-operating characteristic higher than the characteristic curve 32 by trapping electrons in the alumina gate film, so that by applying a gate bias between the initial characteristic and the shifted characteristic, the characteristics of the transistor may be easily distinguished.

Referring now to FIG. 4, a memory matrix circuit 100 suitable for embodying the first embodiment of the present invention is shown. In the circuit of FIG. 4 at the respective cross points intersections of a matrix consisting of row driving wires $W_1$, $W_2$, $W_3$, ......, column driving wires $D_1$, $D_2$, $D_3$, ....., and column readout wires $D'_1$, $D'_2$, $D'_3$, ....., MIS-type memory transistors $Q_{11}$, $Q_{12}$, $Q_{13}$, ..... of the type shown in FIG. 2 employing an insulator film having permanent trapping centers as a gate insulator film are disposed respectively. The respective electrodes of each of the MIS-type transistors are connected in such manner that the gate electrode is connected to the row-driving wire and the drain-and-source electrodes are connected to the column-driving wire and the column readout wire, respectively. In addition the back gate or substrate electrodes of the respective MIS-transistor $Q_{11}$, $Q_{12}$, $Q_{13}$, ..... are connected in common and led out to an external terminal 101. This memory matrix is provided with an address decoder 102 for a word line, and driving circuits 103, 104, 105 responsive to the decoder output for applying driving signals to the respective row wires $W_1$, $W_2$, $W_3$, ..... in its external circuit.

In addition, with regard to the column wires, MIS-transistors $Q_{S1}$, $Q_{S2}$, $Q_{S3}$, ..... for short-circuiting the drain-source regions of the memory transistors upon writing, and MIS-transistors $Q_{D1}$, $Q_{D2}$, $Q_{D3}$, ..... for controlling the reverse biasing voltage applied to the drain-source junction of the memory transistors, are coupled to the memory transistors. Since transistors $Q_{S1}$, $Q_{D1}$, ..... provided in the external circuit are used only upon writing and are not required for memory operation, they may be conventional MIS-type transistors which employ an insulating material having no charge storage effect such as a silicon dioxide film as the gate insulator film. In case of using MIS-transistors similar to memory transistors as the external circuit transistors $Q_{S1}$, $Q_{D1}$, ....., it is feasible to readily fabricate the integrated circuit having the memory circuit shown in FIG. 4. Among these transistors, the transistors $Q_{S1}$, $Q_{S2}$, $Q_{S3}$, ..... have their respective gate electrodes connected to a common write-in command line 106, and their drain-source electrodes connected to the respective pair of column wires $D_1$, $D'_1$; $D_2$, $D'_2$; $D_3$, $D'_3$; ..... respectively, of the matrix.

Further, the driving transistors $Q_{D1}$, $Q_{D2}$, $Q_{D3}$, ..... have their respective gate electrodes connected to a common readout command line 107, and their drain-source electrodes are connected to a common power supply line 108 and the respective column-driving wires $D_1$, $D_2$, $D_3$, ..... . The column readout wires $D'_1$, $D'_2$, $D'_3$, ..... serve to provide output signals via output terminals 109, 110, 111, ..... of this storage device to an external sensing amplifier (not shown) by applying a readout pulse to a particular row-driving wire, similarly to the general word array system.

Figure 5A:
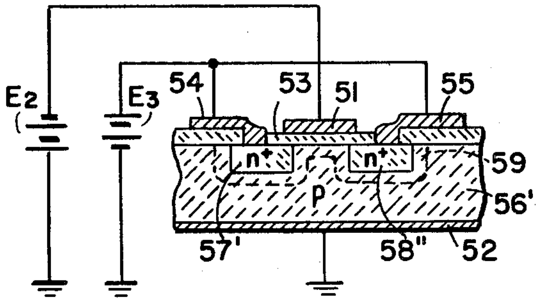
Figure 5B:
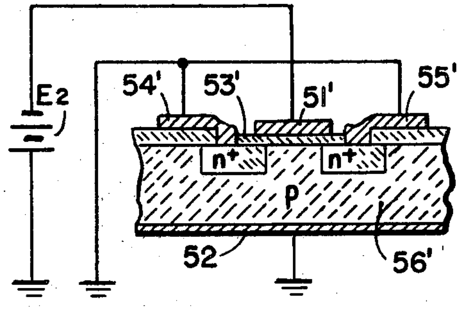

FIGS. 5(A) and 5(B) illustrate a preferred embodiment of the present invention showing the storage operation of negative electric charge in a gate alumina film of a selected memory transistor. According to this embodiment of the present invention, an N-channel type of transistor is used. The injection of electrons in the N-channel transistor occurs from its gate electrode. The power supply arrangement for an MIS-memory transistor upon trapping electrons may be that shown in FIG. 5(A), in which a gate electrode 51 is connected to a voltage source $E_2$ that applies to the electrode 51 a negative voltage with respect to a substrate electrode 52 lower than a critical voltage $V_c$ for storing a negative charge in a gate alumina film 53, and at least one of drain and source electrodes 54, 55 is connected to a voltage source $E_3$ that applies thereto a positive voltage with respect to the substrate electrode. According to the aforementioned arrangement, a depletion layer 59 extends from at least one of the reverse biased PN-junctions formed between drain and source regions 57, 58 and a semiconductor substrate 56′ onto the surface of the P-type semiconductor substrate 56′ immediately beneath the gate electrode. Across the alumina film between the surface of P-type semiconductor substrate near to the PN-junction and the gate electrode, is locally applied a voltage difference between voltages $E_2$ and $E_3$, that is equal to $|E_2|+|E_3|$. By establishing a relation between the critical voltage $V_c$ and the power source voltages $E_2$, $E_3$, of $$|V_c|<|E_2|+|E_3|$$

the electrons injected from the gate electrode can be trapped in that portion of the gate insulator film 53 above the depletion layer.

On the other hand, the power supply arrangement for maintaining the aforementioned MIS-type transistor may be that shown in FIG. 5(B), in which the value of voltage between the back gate electrode 52 and the drain-source electrodes 54′, 55′ of the same transistor is reduced below the critical voltage, and the voltage of either of the voltage sources $E_2$, $E_3$ is maintained below the critical voltage, that is, the relation between the respective voltages is maintained as follows:

$$|E_2|,\ |E_3|<|V_c|.$$

Under the above-mentioned state of voltage application, either in the case that a voltage source $E_2$ is connected between the back gate electrode 52 and the gate electrode 51′ and the drain and source electrodes are maintained at a reference potential (zero potential) as shown in the FIG. 5(B), or in case that the gate electrode 51′ is maintained at a reference potential and a voltage source $E_3$ is connected to the drain-source electrodes, the trapping of electrons in the gate film of alumina cannot occur and so the transistor is maintained in its initial state. However, in this N-channel transistor, it is preferable to use an alumina film 60 storing a negative electric charge for the surface-insulating film other than the gate film, too, in order to avoid a surface parasitic effect in the N-channel transistors. According to the method of the present invention as described above, the write-in operation is carried out by controlling the depletion layer extending from the drain or source junction. Since the gate electrode is always applied with a driving voltage that does not excite the channel (a negative voltage for a N-channel transistor), this write-in driving voltage never causes a conducting channel to be formed in the semiconductor substrate beneath the gate electrode wiring. This prevents a parasitic effect from occurring in the gate electrode wiring portion of the MIS-structure upon applying the present invention to an integrated memory device, and also facilitates a reliable write-in operation to a predetermined portion thereof while retaining other portions in an initial state in a stable manner.

FIGS. 6(A) to 6(C) illustrate voltage waveforms used in the write-in operation to the matrix circuit of FIG. 4 employing N-channel memory transistors. For this transistor, a transistor having a critical voltage of 40 volts across the alumina gate film is used. More particularly, the row-driving wire and the column-driving wire to which the selected memory transistor is connected, have driving pulses 71, 72 of −30 volts and +30 volts, respectively applied thereto, as shown in FIGS. 6(A) and 6(C), while the substrate electrodes making ohmic contact with the semiconductor substrate of the respective transistors, are maintained at 0 volts. Then during the time when the driving pulses 71, 72 are being applied to the predetermined row and column-driving wires, respectively, the transistors which are connected to these row and column wires but not to be subjected to write-in operation, have only those voltages applied thereto that are less in magnitude than the critical value of +30 volts or −30 volts. Whereas across the alumina gate film of the transistor which is located at the selected cross point of the predetermined row and column and to which the write-in operation is to be carried out, a voltage equal to 60 volts is applied thereto which is equal to a voltage difference exceeding the critical value, at least at the portion right above the PN-junction, so that the threshold voltage of the gate of this transistor transfers from the characteristic represented by the initial curve 33 in FIG. 3 to that represented by the shifted curve 32.

Furthermore, with respect to the memory device in which the selective write-in operation has been carried out to the predetermined transistor in the above-described manner, the readout operation can be carried out in such manner that a positive voltage pulse 73 of about 10 volts, which falls between the initial characteristic and the shifted characteristic, is applied to the predetermined row wire, and a readout pulse 74 is applied to the predetermined column wire. As a result either a "0" or "1" current output may be obtained from the column readout wire.

Figure 7A:
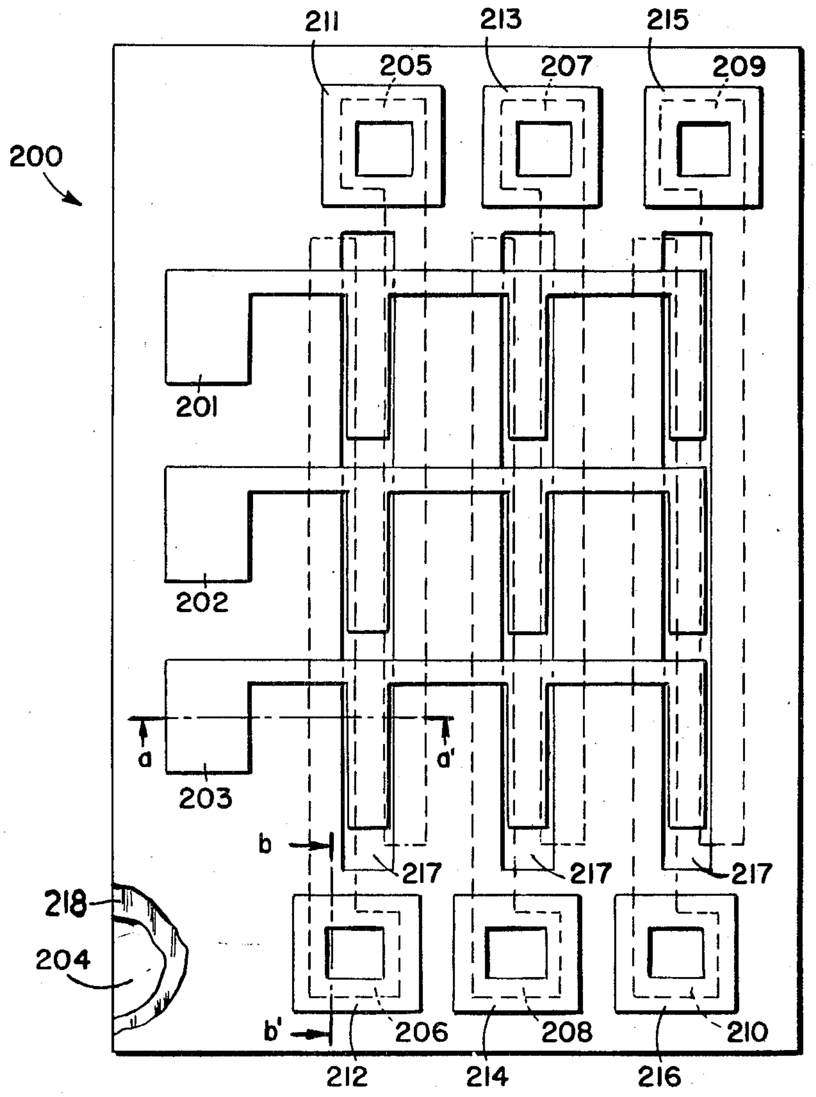
Figure 7B:
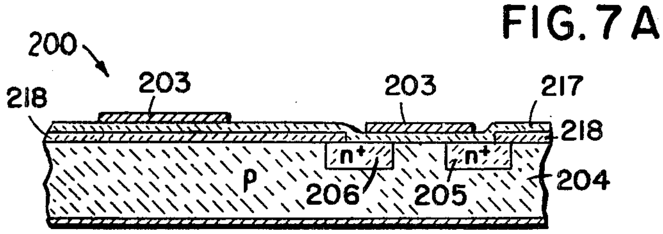
Figure 7C:
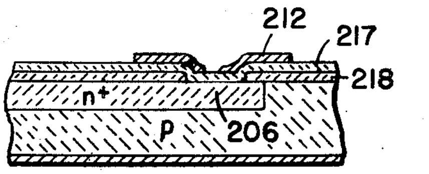

Referring now to FIGS. 7(A) to 7(C), a second embodiment of the present invention 200 illustrated therein is an integrated storage circuit 200 in which a semiconductor substrate of one conductivity type is provided with memory transistors and row and column wirings for constructing a memory matrix circuit. The row-driving wires of aluminum wirings 201, 202, 203 are adherent to the surface of the insulator-coating film of the integrated circuit and extend in the transverse direction, while the column-driving wires and column readout wires consist of high concentration N-type diffusion regions 205, 206, 207, 208, 209, 210 doped at $10^{19}$ to $10^{21}$ atoms/cm.$^3$ diffused within a P-type semiconductor substrate 204 having a specific resistance of 2Ω· cm., and extending in parallel in the longitudinal direction. Therefore, the respective row-and-column wires form cubic crossings called tunnel wirings. The N-type regions 205, 206, ....., 210 serving as the respective column wires are provided with ohmic electrodes 211, 212, 213, 214, 215, 216 for use in connection with the external circuit, at their respective ends. The respective MIS-type transistors are formed at the crossing portions between the aluminum wirings 201, 202, 203 serving as the respective row wires and the respective pairs of N-type regions 205, 206; 207, 208; and 209, 210.

FIG. 7(B) discloses component parts of the memory transistor. As shown in this figure, the transistor having a unit memory function comprises a pair of parallel N-type regions 205, 206 serving as drain-and-source regions, an alumina film 217 deposited on the surface of a semiconductor substrate 204 between the source-and-drain regions and containing permanent trapping centers which serves as a gate insulator film, and a part of a wiring 203 extending on the insulator film for each row which serves as a gate electrode. In the portion irrelevant to an operation of the transistor, the alumina film 217 is deposited on the surface of a silicon dioxide film or covered with a silicon dioxide film having a thickness of about 0.5–1.5μ. Such construction of the surface insulator film can reduce the stray capacitance between the wirings 201, 202, 203 and the semiconductor substrate 204. Moreover, the alumina film 217 serves to prevent the silicon dioxide film 218 from being contaminated by alkali invading from the environment, and also performs a surface inactivation effect for preventing chemical reaction between the wiring metal and silicon dioxide. The above-mentioned subsidiary effect caused by coating the silicon dioxide film 218 by means of the alumina film 217, can be obtained even by making use of the aforementioned silicon nitride film having temporary trapping centers in lieu of the alumina film.

FIG. 7(C) shows a column wire leadout portion according to this embodiment, in which through an aperture portion provided in the insulator films 217, 218 on the surface of the N-type region, is led out an ohmic electrode 212 for this region. In addition, on the back surface of the P-type semiconductor substrate 204 is provided an ohmic electrode 219 serving as a back gate electrode common to the respective transistors.

The integrated memory circuit according to the present embodiment is provided with a quite simplified structure, and it can achieve the write-in operation as described with reference to FIGS. 5 and 6 in a stable and reliable manner. Still further, not only are the memory transistors integrated, but also, if necessary, the MIS-type transistors used in external circuits can be readily formed on the same integrated circuit as shown in FIG. 4. Since this embodiment employs N-channel transistors for memory transistors, in order to prevent a parasitic channel effect, the effect of the positive electric charge in the silicon dioxide film may be avoided either by removing the silicon dioxide film 218 to deposit the alumina film 217 directly on the semiconductor substrate 204, or by forming a phosphorus glass layer on the surface of the silicon dioxide film 218.

In the aforementioned embodiments, if a predetermined voltage is applied simultaneously to the gate electrodes of the transistors along each row wire under the state that a positive voltage has been preliminarily applied to all the drain regions, to thereby cause electrons to be injected from the semiconductor substrate into that portion of the alumina film except for the neighborhood of the drain and to be trapped thereby, and thereafter the write-in operation is carried out so as to control the injection of electrons into the alumina film in the neighborhood of the drain, then the time required for write-in operation can be shortened.

In addition, in the above-described embodiments, though the memory transistor was described in connection with a MIS-transistor employing an alumina film having permanent trapping centers and a silicon nitride film having temporary trapping centers, the same results may be expected in the case of employing other oxides, such as oxides of molybdenum, tantalum, titanium, zirconium, etc.

Therefore, the technical spirit of the present invention should not be limited to the above-mentioned embodiments.

What is claimed is:

1. An electronic circuit comprising an insulator gate field effect transistor having a P-type semiconductor substrate, drain-and-source regions, a gate electrode, and an insulator gate film interposed between said substrate and said gate electrode and adapted to store a negative electric charges in response to a voltage applied thereto at a level exceeding a critical threshold value; means coupled between at least one of said drain and source regions and said substrate for applying a positive voltage between said source and drain regions and said semiconductor substrate; and means coupled between said gate electrode and said semiconductor substrate for applying a negative voltage between said gate and substrate, the difference between said positive and negative voltages exceeding said critical threshold value, whereby electrons injected into said gate film are trapped thereat.

2. A method for writing information into a storage device utilizing semiconductor memory elements arranged in a storage matrix device which employs as its memory elements a plurality of N-channel field effect transistors each of which comprises an insulator gate film adapted to store a negative electric charge in response to the application thereto of an electric field exceeding a critical value and disposed between a P-type semiconductor substrate and a conductor gate electrode, and in which the gate electrode of said transistor is connected to a row-driving wire and the drain-source electrodes are respectively connected to a pair of column wires; said method comprising the steps of applying a driving voltage to a predetermined row driving wire of a polarity that does not invert the channel; maintaining some of said column wires at the same potential as said semiconductor substrate; and applying a voltage to the other of said column wires at a level to inversely bias the PN-junction between said semiconductor substrate and said drain region and to change the characteristic of said transistor to its transferred characteristic by means of the voltage difference between said column voltage and said driving voltage.

3. A semiconductor memory storage device comprising a data storage matrix employing as its memory elements a plurality of insulator gate field effect transistors, each of said transistors including an insulator gate film adapted to store a negative electric charge in response to the application of an electric field exceeding a critical value and disposed between one conducting type of semiconductor substrate and a conductor gate electrode, and in which the gate electrode is connected to a row-driving wire and the drain-source electrodes are respectively connected to one pair of column wires; a row-driving circuit for applying a driving voltage to a predetermined row driving wire of said matrix device, and upon a reading operation for applying a gate bias between the initial characteristic and the transferred characteristic of said transistor; and a column-driving circuit for maintaining some of said column wires at the same potential as that of said semiconductor substrate and for applying to other of said column wires a voltage such that a PN-junction between said semiconductor substrate and the drain region may be inversely biased, and has an opposite polarity to that of said driving voltage, upon a writing operation, and for applying a driving voltage to one of said predetermined pair of column wires and deriving an output voltage from the other of said column wires upon a reading operation.

4. The memory device of claim 3, in which each pair of said column wires includes a column-driving wire coupled to the drain electrodes and a column readout wire coupled to the source electrodes of said transistors arranged in an associated column in said array.

5. The memory device of claim 4, further comprising a control transistor in each of said columns, each of said control transistors having a drain-source circuit coupled to the drain-source circuit of each of said memory transistors in its associated column, and a gate electrode coupled in common to the gate electrodes of the control transistors associated with the other of said columns and to a write-in command line.

6. The memory device of claim 5, further comprising a second control transistor in each of said columns and having a drain electrode coupled in common to the drain electrodes of said memory transistors in its associated column, a source electrode coupled to a power supply line, and a gate electrode coupled to a readout command line, said second control transistor being effective upon the receipt of a readout command at its gate electrode to control the reverse-bias voltage applied to the drain-source junctions of said memory transistors in its associated column.

* * * * *